Figure 1:
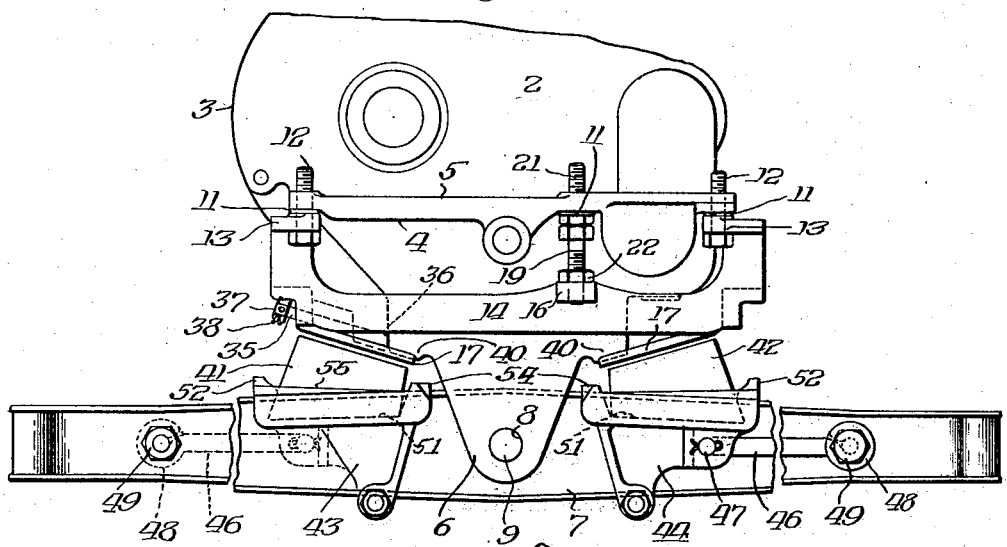

June 24, 1930.  G. C. JETT  1,765,764
FRONT AXLE BUMPER
Filed May 23, 1927   3 Sheets-Sheet 1

Witness:

Inventor
George C. Jett,
By Ira J. Wilson
Atty.

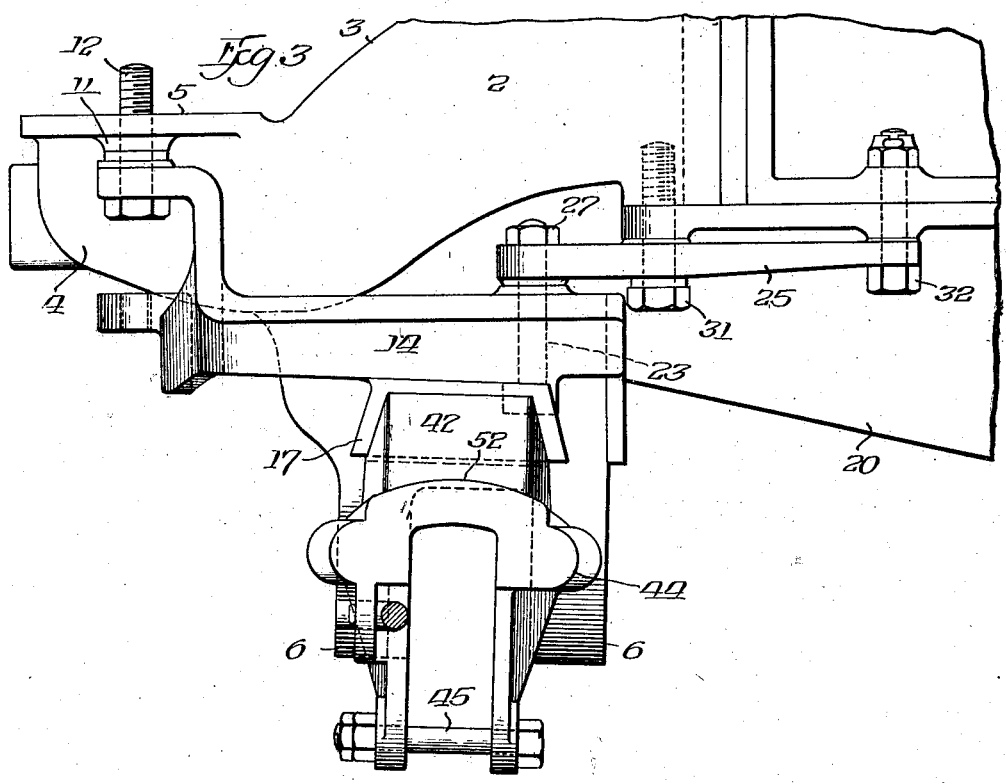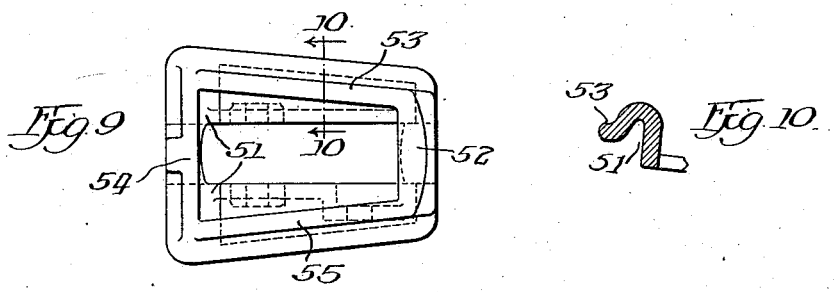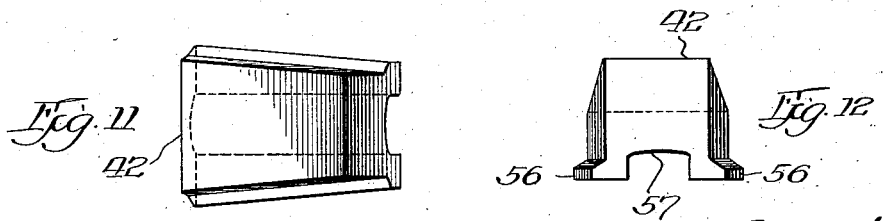

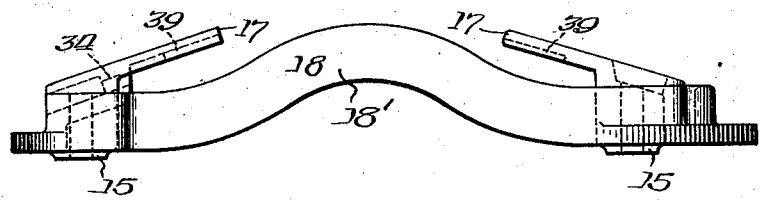
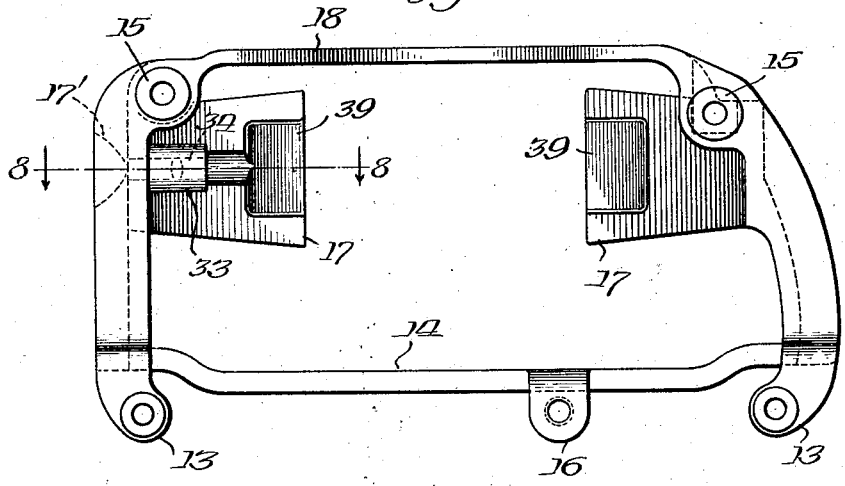
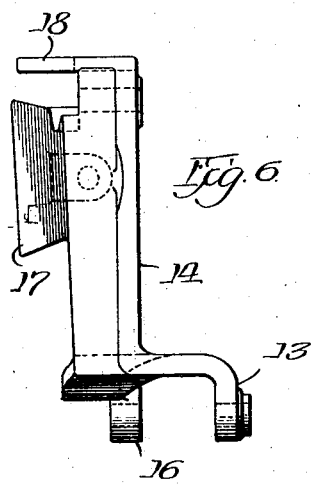
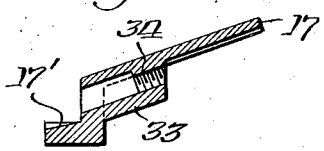
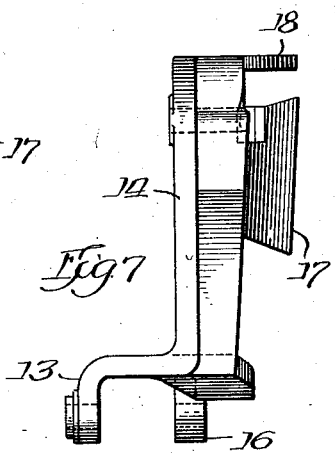

Patented June 24, 1930

1,765,764

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

FRONT-AXLE BUMPER

Application filed May 23, 1927. Serial No. 193,402.

This invention relates to power plant supports for tractors and more particularly to a bumper construction for restricting lateral movements of the power plant relative to the under-carriage or supporting structure. For the purpose of illustrating the invention, a tractor power plant of a well-known type, having its front end pivotally mounted directly upon the front axle of a tractor, has been shown, but it will be appreciated that the invention may be applied with or without modification from the illustrated embodiment to other types and constructions of tractor power plant mounting.

Tractors of the well-known type illustrated are ordinarily equipped with wheels at the factory, but are converted by other manufacturers into tractors of the creeper or chain-tread type for use wherever wheel type tractors may be used and where the latter may not be used. Ordinarily, these tractors have their power plants incased in a relatively dust and dirt-proof incasement or housing which is of fairly strong construction, since it serves to support the power plant from the under-frame, if there be one, or directly from the axles or transverse die members of the tractor, as the case may be. Regardless of the arrangement, it is usual to pivot the power plant unit including the incasement to one of the axles or die members so that the power plant unit and the member to which it is pivoted may swing relatively to one another, that is, the pivot axis is so disposed that the power plant may swing laterally or side to side, relative to the direction of movement of the machine. In the type of tractor power plant mounting illustrating one embodiment of the invention, the power plant incasement is provided with downwardly projecting spaced ears or lugs substantially centrally thereof at its front end for straddling the front axle or transverse supporting member and for pivotal connection thereto.

Difficulties, however, arise with constructions such as that above specified, particularly when the tractor has been converted from a wheel-type to a creeper-type and is moving over rough or uneven ground, or encounters an obstacle at one side or the other, for in such instances, the power plant and axle may be swung relatively to one another with such force and to such an extent that the axle is driven against the incasement or other structural portion of the power plant and inflicts damage of serious consequence. This is not only particularly true of tractors of the pivoted or swinging power plant types, equipped with chain thread or gripper sprockets, but also of such types of tractor when equipped with the ordinary round wheels, as will be apparent. In any case, whether the power plant be pivotally mounted on a member transverse to it at its front or rear end, or intermediate its ends, it may be necessary or desirable to limit the extent of relative movement that may be had and to prevent the shock or limitation of such movements from being imparted to any one particular portion of the power plant or its incasement, for if this should happen it would undoubtedly result in serious damage such as breakage of the incasement or power plant operating parts.

One of the primary objects of my invention is to provide a bumper or movement limiting shock absorbing arrangement whereby relative movements of the tractor body or power plant and frame or axles may be limited resiliently.

Another important object is to provide a bumper or buffer construction whereby the shocks of limitation of relative movements of the body or power plant and axle or other supporting structure may be distributed over a relatively wide area of the body or power plant and its incasement to minimize danger of fracture or breakage.

A further object is to provide a bumper or shock absorber construction of the character specified which may be readily adapted to axles or power plant supporting members with which tractors may be equipped by their manufacturers and which may be installed by the user at any time without difficulty. In this connection, special shock-absorber adapters may be utilized for different types of axle or power plant supporting members, as for instance that type of axle illustrated in my copending application, Serial No. 153,539, filed December 9, 1926.

A still further object of the invention is to provide a novel and efficient type of resilient bumper which may be cheaply manufactured and effectively utilized for its purpose.

Figure 2:
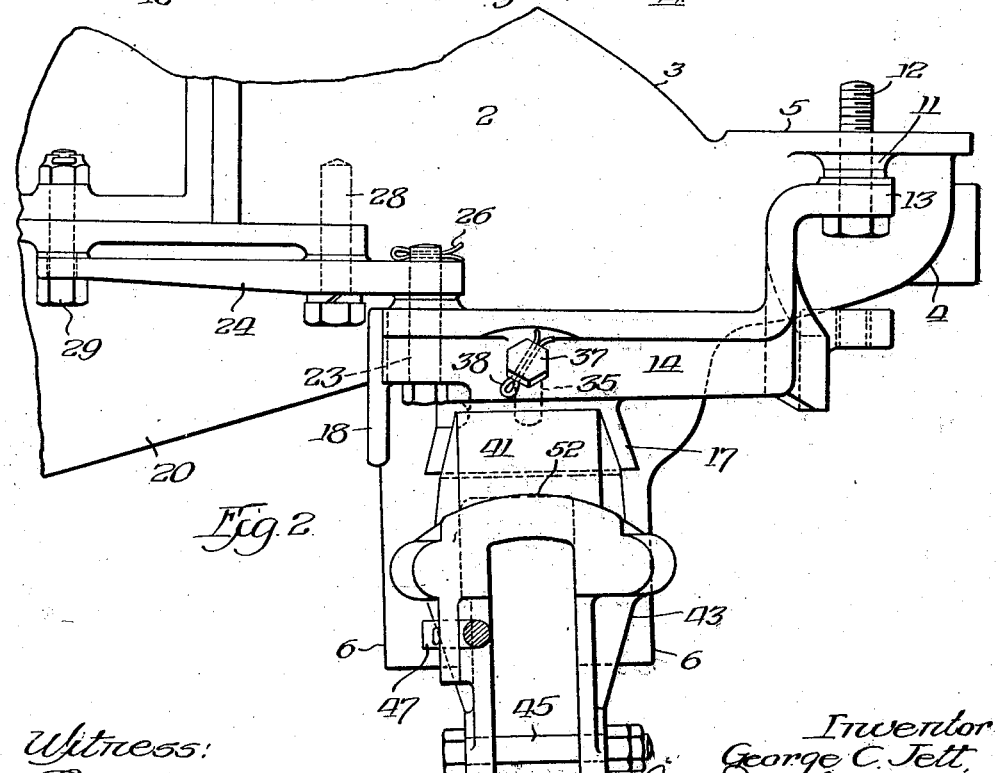

Many further objects, including the details of construction, arrangement and construction of parts, will be, or should become, readily appreciated after reading the following description and claims and after viewing the drawings in which:

Fig. 1 is a front elevational view of a well-known type of tractor power plant mounted on its factory equipped axle, with one form of my invention applied thereto, Fig. 2 is a side elevational view of the same on a slightly enlarged scale, looking from the left of Fig. 1, Fig. 3 is a side elevational view of the same on a slightly enlarged scale, looking at the right hand side of Fig. 1, Fig. 4 is a top plan view of one form of a special adapter construction for attachment to the power plant incasement for absorbing and distributing the shocks of limitation of relative movements of the power plant and axle to which it is pivoted.

Figs. 5, 6 and 7, are respectively rear and left and right side elevational views of the device illustrated in Fig. 4, Fig. 8 is a section taken on the line 8—8 of Fig. 4, Fig. 9 is a top plan view of a bumper wedge retainer, Fig. 10 is a fragmentary section taken on the line 10—10 of Fig. 9, and Figs. 11 and 12 are top plan and butt end elevational views of one form of wedge bumper for use with the wedge bumper retainer and shock distributing adapter illustrated in the previously described figures.

Referring to the drawings more particularly, 2 generally designates the power plant of a well-known type of tractor suitably incased in a housing, a portion of which, designated 3, is usually termed the cylinder front cover. This housing member or cylinder front cover 3 is usually a casting and is provided with a forwardly projecting portion generally designated 4, the top surface 5 of which is flat to provide a shelf or bracket upon which the radiator is supported and secured. This cylinder front cover casting is also provided with two downwardly directed spaced lugs or ears 6 providing a yoke adapted to straddle a transverse supporting member or axle 7 at its center section and each is drilled as shown at 8 for the reception of a pivot pin 9 which passes through them and through an opening drilled in the axle. It will thus be apparent that the power plant is pivotally supported on the axle so that it may swing laterally from side to side with respect to the axle.

The bracket 4 is ordinarily provided with three bosses 11 through which openings are drilled for reception of stud bolts which secure the radiator in place, but for the purpose of attaching a part of my invention, the usual stud bolts at the sides are removed and longer ones 12 substituted. The stud bolts 12 pass through lugs 13 formed on what I shall term the wedge bumper bracket, generally designated 14, which, for the modification and application of the invention herein illustrated, is formed as shown more particularly in Figs. 4 to 8 inclusive, to which reference will now be made.

The wedge bumper bracket 14 is preferably a steel casting of generally rectangular shape in plan, having three lugs, 13, 13 and 16. It is also provided with bosses 15, and with bumper stop plates 17. A recessed portion 17′, the purpose of which will be described, is formed in one side of the bracket 14. The rear transverse member of the bumper bracket is curved downwardly as shown at 18′ for the purpose of clearing a rounded portion of the cylinder front cover of the tractor power plant. When the bumper bracket is to be secured in place on the cylinder front cover, the bolts 12 are passed through the lugs 13 and 11 and into the radiator, a stud bolt 19 is screwed into the lug 16 which is positioned so that the head of the stud bolt 19 will engage the head of a stud bolt 21, also serving to secure the radiator to the cylinder front cover, and a lock nut 22 is arranged on the stud bolt 19 and against the lug 16 so that the stud bolt 19 may be urged against the head of stud bolt 21 to put tension on the bumper bracket 14 and thereafter be locked in place.

The bosses 15 of the rear portion of the bumper bracket are provided with holes for the reception of stud bolts 23 which pass therethrough and screw into stay members 24 and 25 and are secured in place as by cotter key 26 and nut 27. The stay member 24 for the left hand side, viewing the front of the tractor, is secured to the cylinder front cover 3 and to the crank case sump 20 by bolts 28 and 29, while bolts 31 and 32 likewise secure the stay member 25 in a similar manner on the opposite side of the tractor and as thus positioned, the bumper bracket is tightly secured against longitudinal or vertical movements. Impacts received on the stop plates 17 will be transmitted to those portions of the front cylinder cover and the other portions of the power plant incasement, best able to receive them. Such shocks will also be distributed over a relatively wide area and not at any one or two places, as has heretofore been the case.

In order to secure the bumper bracket against side slap or lateral movements, the left hand side of the bracket intermediate the sides of the stop plate 17 on the top surface of the latter is provided with a boss 33 which is drilled as shown at 34 at an angle to the horizontal and tapped for the reception of a set screw 35, the inner end of which is adapted to abut against a shoulder 36 formed on the cylinder front cover and the head 37 of which is received in the recess 17' and provided with a cotter key 38 which prevents it from turning therein. The top surfaces of the stop plates 17 may be recessed as shown at 39 for the purpose of receiving bosses 40 formed on the cylinder front cover in abutting relation. It should be understood that the steel casting is made of sufficient proportions to afford the requisite strength for the part it is to play.

The bottom surfaces of the stop plates 17 are substantially flat in a preferred form of the invention and cooperate with similarly shaped top surfaces of rubber or other resilient composition wedge shaped bumpers, generally designated 41 and 42 respectively which are carried in special adapters mounted on the front axle. Referring now more particularly to Figs 1, 2, 3 and 9 to 12 inclusive, a pair of saddle members or wedge retainers 43 and 44, one left hand and one right hand, are provided, and since they are substantially identical with one another, a description of one will suffice for both. Each wedge retainer is of yoke shape, as shown in Figs. 2 and 3, so that it may straddle the front axle 7. The lower ends of the yoke arms are drilled for the reception of bolts 45 which pass beneath, but closely adjacent the bottom surface of the axle, to preven them from jumping out of place, while anchor rods 46, each bent at right angles at one end, as shown at 47 for engagement through a suitable aperture in one arm of the yoke of each retainer where it is cottered in place, and at its other end provided with an eye 48 through which and through suitable apertures in the ends of the axles, bolts 49 are passed, prevent movement of the retainers along the axle.

The top portions of the wedge retainers are provided with depressed seat portions 51 normally below the level of the top surface of the axle 7 and are bounded on all four sides by flanges 52, 53, 54 and 55. The flanges 52 are undercut, as more clearly shown in Figs. 1 and 9 for engagement with the lower right and left hand edges of the butt face of the rubber wedges 41 and 42, while the flanges 53 and 55 are likewise undercut or overhanging inwardly toward one another as illustrated in Fig. 10 for engagement about the outwardly flanged portions 56 of the side edges of the rubber wedges so that the wedges, when forced into place on the seats 51, will be tightly retained in the wedge retainer. The wedges for the type of construction illustrated are also notched or grooved longitudinally and centrally of their bottom faces, as shown at 57, for the purpose of straddling and riding upon the top surface of the axle whereby the axle, when the retainers with their wedge bumpers in place, will, together with the flanges 52, 53 and 55, prevent the wedges from coming out of place. The notch or groove 57 aids in inserting the wedges into their retainers for they may thereby be compressed sufficiently, by grasping the side flanges 56, to clear the flanges 53 and 55 but other forms and types of wedges and retainers may be used.

The wedges and their associated parts are so constructed and arranged as to leave a reasonable clearance between the top surfaces of the wedges and the stop plates 17 and 18 when the parts are assembled in their normal operating position. Since this clearance is provided and since the wedges are made of rubber or other resilient material, the axle 7 and the power plant unit may pivot relatively to one another about the pivot 9 for a reasonable distance, a distance sufficient to prevent straining the tractor parts and mechanism when traveling over uneven or rough ground, but since excessive ranges of movement are not often necessary and are usually objectionable, they will be prevented. Not only will the relative movements of power plant and axle be limited, but there will be no danger of metal part contacting sharply with metal part, and by reason of the bumper bracket and its stops and their arrangement, the load imposed on both the power plant unit and axle by reason of the limitation of their relative movements will be absorbed and distributed over a wide area, thereby eliminating undue stresses and possible strains and fractures of the several parts.

The construction, arrangement, and advantages of the form of my invention illustrated and described, as well as the advantages of the invention as a whole and its applicability to many types of construction, other than that disclosed will undoubtedly be apparent to the reader, and since the invention within its scope, embraces forms bearing little if any resemblance to that illustrated and described, I do not desire to be limited by the latter, but only by the scope of the appended claims.

I claim:

1. In a tractor, a transverse supporting member, a tractor body including a power plant incasement pivotally connected to said supporting member for swinging movements relative thereto, stop means on said support for resiliently limiting said relative swinging movements, and rigid means rigidly secured to said incasement and normally unconnected with said limiting means for distributing any shock effects of limitation of such relative movements over a relatively large area of said incasement.

2. In a tractor, a power plant housing, a front axle, a rigid bolster rigidly secured to the front edge of said housing at a plurality of widely separated places and to the two lateral sides of said housing at a plurality of widely separated places on each side, said bolster being pivotally connected to said axle and movable relative thereto only pivotally, and resilient means rigidly secured to said axle at opposite sides of said pivot positioned normally out of contact with said bolster but adapted to serve as bumpers upon pivotal movement of the bolster relative to the axis beyond certain predetermined limits.

In witness of the foregoing I affix my signature.

GEORGE C. JETT.